(12) United States Patent
Yamada et al.

(10) Patent No.: US 7,830,811 B2
(45) Date of Patent: Nov. 9, 2010

(54) TERMINAL APPARATUS, TERMINAL APPARATUS CONTROL METHOD, NETWORK SYSTEM, NETWORK SYSTEM CONTROL METHOD, PROGRAM AND RECORDING MEDIUM

(75) Inventors: Hiroshi Yamada, Tokyo (JP); Shinji Utsunoimiya, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 557 days.

(21) Appl. No.: 10/577,452

(22) PCT Filed: Oct. 28, 2004

(86) PCT No.: PCT/JP2004/016052

§ 371 (c)(1),
(2), (4) Date: Aug. 14, 2008

(87) PCT Pub. No.: WO2005/043827

PCT Pub. Date: May 12, 2005

(65) Prior Publication Data

US 2008/0298263 A1    Dec. 4, 2008

(30) Foreign Application Priority Data

Oct. 30, 2003    (JP) .............................. 2003-370719

(51) Int. Cl.
 *G01R 31/08* (2006.01)
(52) U.S. Cl. ...................................... 370/252
(58) Field of Classification Search ....................... None
See application file for complete search history.

(56) References Cited

U.S. PATENT DOCUMENTS

| | | | |
|---|---|---|---|
| 5,341,363 A * | 8/1994 | Hirasawa | ..................... 370/221 |
| 5,636,345 A | 6/1997 | Valdevit | |
| 6,539,000 B1 * | 3/2003 | Murai et al. | ................. 370/260 |
| 6,810,263 B1 * | 10/2004 | Cheng et al. | ................. 455/510 |
| 2002/0073338 A1 * | 6/2002 | Burrows et al. | ............. 713/201 |
| 2004/0022253 A1 * | 2/2004 | Foschiano et al. | ...... 370/395.54 |
| 2004/0193719 A1 * | 9/2004 | Yang et al. | ................... 709/229 |

FOREIGN PATENT DOCUMENTS

| | | |
|---|---|---|
| JP | 02-092043 | 3/1990 |
| JP | 04-334231 | 11/1992 |
| JP | 07-007515 | 1/1995 |
| JP | 07-336373 | 12/1995 |

OTHER PUBLICATIONS

A. Guruprasad, P. Pandey, and B. Prashant, "Security Features in Ethernet Switches for Access Netorks," IEEE TENCON 2003, Conference on Convergent Technologies for the Asia-Pacific Region, Bangalore, India, Oct. 15, 2003, p. 1211-14, vol. 4, Conf. 18. (4 pages).

* cited by examiner

*Primary Examiner*—Kevin C Harper
(74) *Attorney, Agent, or Firm*—Finnegan, Henderson, Farabow, Garrett & Dunner LLP (57) ABSTRACT

There is provided a terminal apparatus capable of, when the volume of packets received by the terminal apparatus is abnormally increased, disconnecting the terminal apparatus from a network and continuously performing a process other than a process regarding received packets by the steps of detecting the number of packets received from the network in a predetermined time, logically disconnecting the terminal apparatus from the network when the number of packets exceeds a predetermined value, and reconnecting the terminal apparatus to the network after a predetermined time has elapsed.

14 Claims, 6 Drawing Sheets

TERMINAL APPARATUS, TERMINAL APPARATUS CONTROL METHOD, NETWORK SYSTEM, NETWORK SYSTEM CONTROL METHOD, PROGRAM AND RECORDING MEDIUM

TECHNICAL FIELD

The present invention generally relates to network control and more particularly to the control of a terminal apparatus connected to a network for transmitting broadcast packets.

BACKGROUND ART

In recent years, network systems such as LANs have been widely used in offices and factories, in which the LANs are built by connecting plural terminals including an embedded computer to one another. In such network systems, data is usually transmitted in packets. Headers of the packets include a destination (address) and a sender's address. Each terminal selectively processes only those packets intended for the terminal and performs operations based on commands or data included in the packets.

In many cases, the network systems as mentioned above have a function for simultaneously transmitting data (namely, packets) of the same contents to all terminals connected to the network. These packets are generally referred to as broadcast packets and the destinations are set such that they are the addresses of all the terminals connected to the network.

The systems using the broadcast packets do not need to generate packets in which destination addresses are separately set for all the terminals, so that this function is useful. However, it is known that the broadcast packets are massively generated in the network for some reason such as inconsistency of setting information in the network, program failure, and the like and this causes a serious network failure. Such a phenomenon is generally referred to as a broadcast storm.

In other words, when the broadcast packets are massively generated and the broadcast storm is generated, each terminal connected to the network receives a large amount of broadcast packets in a short time. Thus, a data processing unit such as CPU in each terminal spends most of the processing capacity in order to process the large amount of received broadcast packets, so that other processing requires a vary long time and the operation of the terminal may be suspended in the worst case.

If such a situation is caused, the terminal becomes inoperative until the broadcast storm is eliminated. Further, the inoperative terminal must be disconnected from the network and re-started. During this procedure, the operation and processing of the terminal is suspended. For example, when such a broadcast storm is generated in a network in a factory, since terminals include production equipment and manufacturing equipment, production lines may be stopped and great damage may be caused.

In order to solve the problems as mentioned above, logical disconnection of a computer system from a local area network (LAN) has been proposed, in which reception packets transmitted via the LAN are monitored in the computer system connected to the LAN and the computer system is logically disconnected from the LAN when a specific packet causing or capable of causing network failure is detected (refer to Patent Document 1, for example).

Also, disconnection of a specific terminal from a network cable has been proposed, in which a traffic monitoring device is connected to the network so as to detect the volume of traffic on the network and the specific terminal is disconnected from the network cable when the detected traffic volume exceeds a predetermined value (refer to Patent Document 2, for example).

Further, regarding techniques of the capability for processing received data, suspension of a transmission process at a node has been proposed, in which a medium is set to a busy status and the transmission process at the node about to transmit data is suspended when there is no room for reception in a buffer for temporarily storing received data (refer to Patent Document 3, for example).

Patent Document 1: Japanese Laid-Open Patent Application No. 4-334231

Patent Document 2: Japanese Laid-Open Patent Application No. 7-7515

Patent Document 3: Japanese Laid-Open Patent Application No. 2-92043

According to techniques disclosed in Patent Document 1, the terminal disconnects itself from the network when judging that received packets include a broadcast packet (specific packet) capable of causing a broadcast storm. Thus, information about the specific packet capable of causing the broadcast storm must be set in the terminal in advance. In other words, the specific packet capable of causing the broadcast storm is a known packet, so that when unknown packets are massively generated in the network, the terminal cannot recognize the unknown packets as the specific packet. In such a case, there is still a possibility that the terminal may become inoperative by receiving a large amount of unknown packets.

On the other hand, according to techniques disclosed in Patent Document 2, it is not necessary to set information about the specific packet in the terminal in advance, since a data volume (packet volume) flowing on the network is monitored and the generation of abnormality such as the broadcast storm is detected. Thus, even when unknown packets are massively generated, it is possible to disconnect a specific terminal from the network. However, the monitoring of the traffic volume and the disconnection of the terminal are performed using the traffic monitoring device, so that the traffic monitoring device must be connected to the network separately from each terminal. Further, a terminal to be disconnected when the traffic volume is increased must be set in advance in the traffic monitoring device.

In this manner, according to the techniques disclosed in Patent Document 2, the specific terminal is disconnected from the network in order to control the traffic volume in the entire network system and the terminal to be disconnected is determined by other terminal (traffic monitoring device) connected to the network. In other words, the terminal does not disconnect itself from the network based on the packet volume received by the terminal.

Moreover, according to techniques disclosed in Patent Document 3, the medium is set to a busy status and transmission is delayed when there is no available capacity in the buffer for temporarily storing received data to be processed, so that all received packets are assumed to be processed. In other words, the terminal is not disconnected and processing is suspended when the volume of the received packets is too large. Thus, when temporarily receiving a large amount of packets as in the case of the broadcast storm, the reception of the large amount of packets is merely delayed and the packets are processed afterward. Thus, it is impossible to solve the problem of being unable to process packets to be processed other than unnecessary broadcast packets.

DISCLOSURE OF THE INVENTION

It is a general object of the present invention to provide an improved and useful terminal apparatus in which the above-mentioned problems are eliminated.

A more specific object of the present invention is to provide a terminal apparatus capable of disconnecting the terminal apparatus from the network and continuously performing a process other than a process of received packets when the packet volume received by the terminal apparatus of the network is abnormally increased.

According to the present invention, there is provided a terminal apparatus connected to a network and configured to perform an operation, the terminal apparatus comprising: a packet volume detecting unit configured to detect the number of packets received from the network in a predetermined time; and a logical disconnecting unit configured to logically disconnect the terminal apparatus from the network when the number of packets detected by the packet volume detecting unit exceeds a predetermined value.

In the above-mentioned terminal apparatus, the packet volume detecting unit may detect the number of only those broadcast packets among packets received by the terminal apparatus, and the logical disconnecting unit may logically disconnect the terminal apparatus from the network when the number of broadcast packets received in a predetermined time exceeds a predetermined value.

Preferably, the above-mentioned terminal apparatus according to the present invention further includes a reconnecting unit configured to reconnect the terminal apparatus to the network after a predetermined return time has elapsed since the terminal apparatus is disconnected form the network by the logical disconnecting unit. The reconnecting unit may increase the length of the return time longer than that of the return time in a previous disconnection when the terminal apparatus is disconnected again after the reconnection.

Preferably, the terminal apparatus according to the present invention includes an operation inputting device for inputting a connection order for connecting the terminal apparatus to the network. Further, the terminal apparatus according to the present invention preferably includes a display device for displaying the fact that the terminal apparatus is disconnected. Moreover, the terminal apparatus according to the present invention may further include: a unit for storing history information about disconnection and reconnection of the terminal apparatus; and a display device for displaying the history information.

In the above-mentioned terminal apparatus according to the present invention, the packet volume detecting unit does not have to detect the number of the packets when the terminal apparatus is logically disconnected from the network.

The above-mentioned terminal apparatus according to the present invention may include a first changing unit configured to change the predetermined value in accordance with processing contents required via the network. Further, the first changing unit may change the predetermined value in accordance with a transition of the processing contents required via the network.

The above-mentioned terminal apparatus according to the present invention may include a second changing unit configured to change the predetermined value in accordance with the frequency of logical disconnection from the network.

According to the present invention, there is provided a control method of a terminal apparatus connected to a network and configured to perform an operation, the control method of a terminal apparatus comprising the steps of: detecting the number of packets received from the network in a predetermined time; and logically disconnecting the terminal apparatus from the network when the detected number of packets exceeds a predetermined value. Further, there are provided a computer-readable program for causing a computer to perform the control method of a terminal apparatus and a computer-readable recording medium in which the computer-readable program is recorded.

According to the present invention there is provided a network system including a plurality of terminal apparatuses connected to a network, each terminal apparatus comprising: a packet volume detecting unit configured to detect the number of packets received from the network in a predetermined time; and a logical disconnecting unit configured to logically disconnect the terminal apparatus from the network when the number of packets detected by the packet volume detecting unit exceeds a predetermined value.

According to the present invention, there is provided a control method of a network system including a plurality of terminal apparatuses connected to a network, the control method of a network system comprising the steps of: detecting, in each terminal apparatus, the number of packets received from the network in a predetermined time; and logically disconnecting a corresponding terminal apparatus from the network when the detected number of packets exceeds a predetermined value. Further, according to the present invention, there are provided a computer-readable program for causing a computer to perform the control method of a network system and a computer-readable recording medium in which the computer-readable program is recorded.

According to the present invention, when the packet volume received by the terminal apparatus of the network in a certain time exceeds a predetermined value as in the generation of a broadcast storm, the terminal apparatus is disconnected from the network. Thus, an abnormal increase in a load on a processing unit of the terminal apparatus is prevented and the terminal apparatus is capable of continuously performing a process other than a process of unnecessary packets.

Other objects, features and advantage of the present invention will become more apparent from the following detailed description when read in conjunction with the accompanying drawings.

DETAILED DESCRIPTION OF THE PREFERRED EMBODIMENTS

In the following, an embodiment of the present invention is described with reference to the accompanied drawings.

Figure 1:
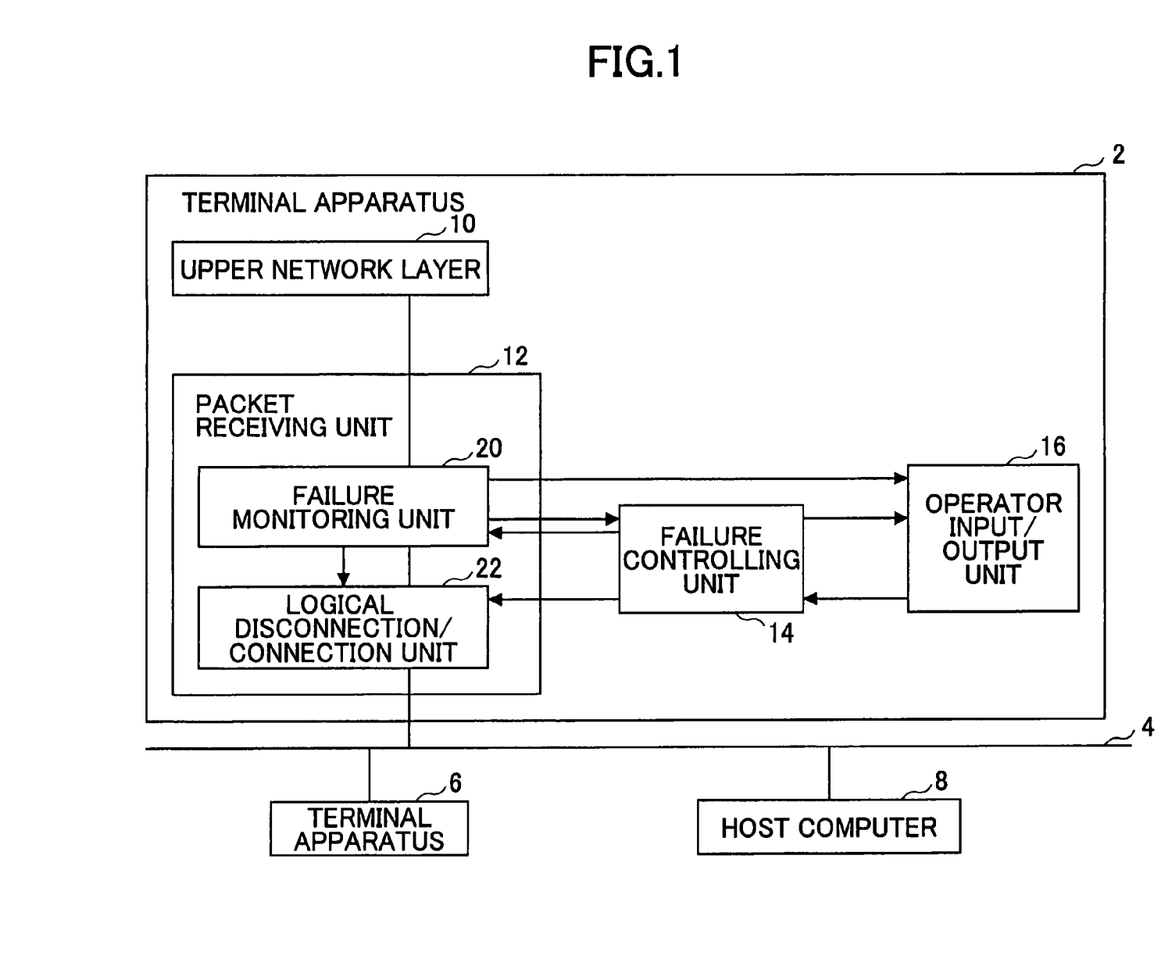
FIG. 1 is a block diagram showing a functional configuration of a terminal apparatus according to one embodiment of the present invention.

FIG. 1 is a block diagram showing a functional configuration of a terminal apparatus according to one embodiment of the present invention. A terminal apparatus 2 shown in FIG. 1 is connected to a network 4 (regardless of whether it is wired or radio) and capable of exchanging data (packets) with other terminal apparatus 6 and a host computer 8 via the network 4.

The terminal apparatus 2 includes a computer system, an apparatus in which a computer system is embedded, or the like. The terminal apparatus 2 processes packets received from the network 4 and performs operations based on data included in the packets. The terminal apparatus 2 has a function for monitoring the volume of received packets and disconnecting the terminal apparatus 2 from the network 4 based on the detected volume of packets in addition to the original functions of the terminal apparatus.

In other words, as shown in FIG. 1, the terminal apparatus 2 includes an upper network layer 10 for performing the original functions of the terminal apparatus and a network application, a packet receiving unit 12 for receiving packets from the network 4, a failure managing unit 14 for checking the packets received by the packet receiving unit 12 and managing information about failure when a failure is generated in the network 4, and an operator input/output unit 16 for outputting information to an operator of the terminal apparatus 2 and allowing the operator to input information and orders.

The packet receiving unit 12 includes a failure monitoring unit 20 and a logical disconnection/connection unit 22. The failure monitoring unit 20 detects the volume of broadcast packets received from the network 4 in a predetermined time based on information from the failure managing unit 14. For example, the failure monitoring unit 20 receives information in which monitoring interval information (one second, for example) for detecting the packet volume is included, and counts the number of the broadcast packets received in the monitoring interval (one second, for example). When the counted number exceeds a threshold value (predetermined volume), the failure monitoring unit 20 notifies the failure managing unit 14 of the fact that a failure such as a broadcast storm is generated in the network 4 or a possibility that a failure may be generated in the network 4. At the same time, when the counted number of the broadcast packets exceeds the threshold value (predetermined volume), the failure monitoring unit 20 issues a disconnection order to the logical disconnection/connection unit 22. Whether received packets include the broadcast packets can be readily determined by checking destination addresses included in the packet headers, for example.

The logical disconnection/connection unit 22 logically disconnects the terminal apparatus 2 from the network 4 upon receiving the disconnection order from the failure monitoring unit 20. Also, after the terminal apparatus 2 is logically disconnected from the network 4, the logical disconnection/connection unit 22 reconnects the terminal apparatus 2 to the network 4 upon receiving a connection order from the failure managing unit 14. In this case, the logical disconnection does not mean that the terminal apparatus 2 is physically disconnected from a network cable, but that the terminal apparatus 2 is set so as not to receive packets from the network 4 through the control of software. Specifically, the terminal apparatus 2 outputs a logically disabling signal or is forcibly reset by a network device so as not to accept any input thereafter (an interrupt is not raised in the CPU), for example. Thus, while the terminal apparatus 2 is logically disconnected, the detection and the counting of packets such as the broadcast packets by the failure monitoring unit 20 are not performed.

On the other hand, when the fact that the counted number of the broadcast packets exceeds the threshold value is notified, the failure managing unit 14 notifies the operator of the generation of a network failure via the operator input/output unit 16. In other words, the operator input/output unit 16 includes a display device and the fact that the network failure is generated is displayed on the display device. The operator is capable of recognizing that the network failure is generated and the terminal apparatus 2 is disconnected from the network 4 by viewing the display device. In this case, the fact that the terminal apparatus 2 is disconnected form the network 4 may be displayed along with the generation of the network failure.

The failure managing unit 14 records information indicating the generation of the network failure as a log. The operator is capable of recognizing the generation time of network failure and the number and the period of the disconnection of the terminal apparatus 2 by examining the record of the log afterward.

When the counted number of the broadcast packets exceeds the threshold value (predetermined volume), the failure monitoring unit 20 is capable of directly notifying the operator input/output unit 16 in addition to notifying the failure managing unit 14. The operator input/output unit 16 displays the fact that the network failure is generated on the display device in accordance with the notification.

In this case, after the terminal apparatus 2 is disconnected from the network 4, the terminal apparatus 2 must be connected to the network 4 again. For example, in many cases, the broadcast storm usually comes to an end in a certain short time and the network abnormality is eliminated by itself. Then, the terminal apparatus 2 is reconnected to the network 4 based on the estimation of when the broadcast storm is ended.

The reconnection to the network 4 may be automatically performed after a predetermined time (automatic return) or may be manually performed by the operator (manual return).

In order to perform the automatic reconnection, the operator sets the automatic return in the failure managing unit 14 in advance via the operator input/output unit 16. Based on this setting, the logical disconnection/connection unit 22 is controlled so as to reconnect the terminal apparatus 2 to the network 4 after a predetermined automatic return interval has elapsed since the disconnection of the terminal apparatus 2 from the network 4. In this case, the automatic return interval is eight seconds, for example. If the number of the broadcast packets at a first detection after the automatic return still exceeds the threshold value, the terminal apparatus is to be disconnected from the network 4 again. In this case, the automatic return interval may be increased longer than the previous one. For example, a first automatic return interval is set to be eight seconds and the automatic return interval in the next disconnection is set to be sixteen seconds. Thereafter, the automatic return interval is increased to 32 seconds and 64 seconds. The automatic return interval remains to be 64 seconds after being set to 64 seconds.

The automatic return interval is gradually increased as mentioned above when the number of the first count after the automatic return still exceeds the threshold value, namely, when the network failure is not eliminated. When the number of the count does not exceed the threshold value after the automatic return, the automatic return interval is returned to eight seconds.

In order to perform the manual return, the operator inputs a connection request using an input operation device of the operator input/output unit 16. The connection request is sent to the failure managing unit 14 and the failure managing unit 14 sends a connection order to the logical disconnection/connection unit 22 based on the connection request. Accordingly, the logical disconnection/connection unit 22 reconnects the terminal apparatus 2 to the network 4.

In the above-mentioned description, the number of the broadcast packets received by the terminal apparatus 2 is counted and the generation of the network failure is determined when the counted value exceeds the threshold value. However, the number of all packets received by the terminal apparatus 2 may be counted so as to determine the generation of the network failure when the counted value exceeds the threshold value. In this case, the threshold value may be set taking into consideration the number of packets usually received by the terminal apparatus 2.

As mentioned above, the failure managing unit 14 manages behavior information and management content information and outputs the information appropriately to the failure monitoring unit 20, the logical disconnection/connection unit 22 and the operator input/output unit 16. Based on the information, the failure monitoring unit 20, the logical disconnection/connection unit 22, and the operator input/output unit 16 perform a terminal apparatus disconnection/reconnection process described below.

In this case, the behavior information includes information about items below.

(1) Whether to monitor the broadcast volume.
(2) Return method (automatic return or manual return) when a network failure is generated.
(3) Automatic return interval time (8 seconds, 16 seconds, 32 seconds, and 64 seconds thereafter, for example).
(4) Monitoring interval (one second, for example)
(5) Threshold value regarding the number of packet counts (10000 packets, for example)

Also, the management content information includes information about items below.

(1) Behavior information
(2) Failure generation status
(3) Cause of phenomenon generation
(4) Connection status of a terminal apparatus (disconnected/connected)

Figure 2:
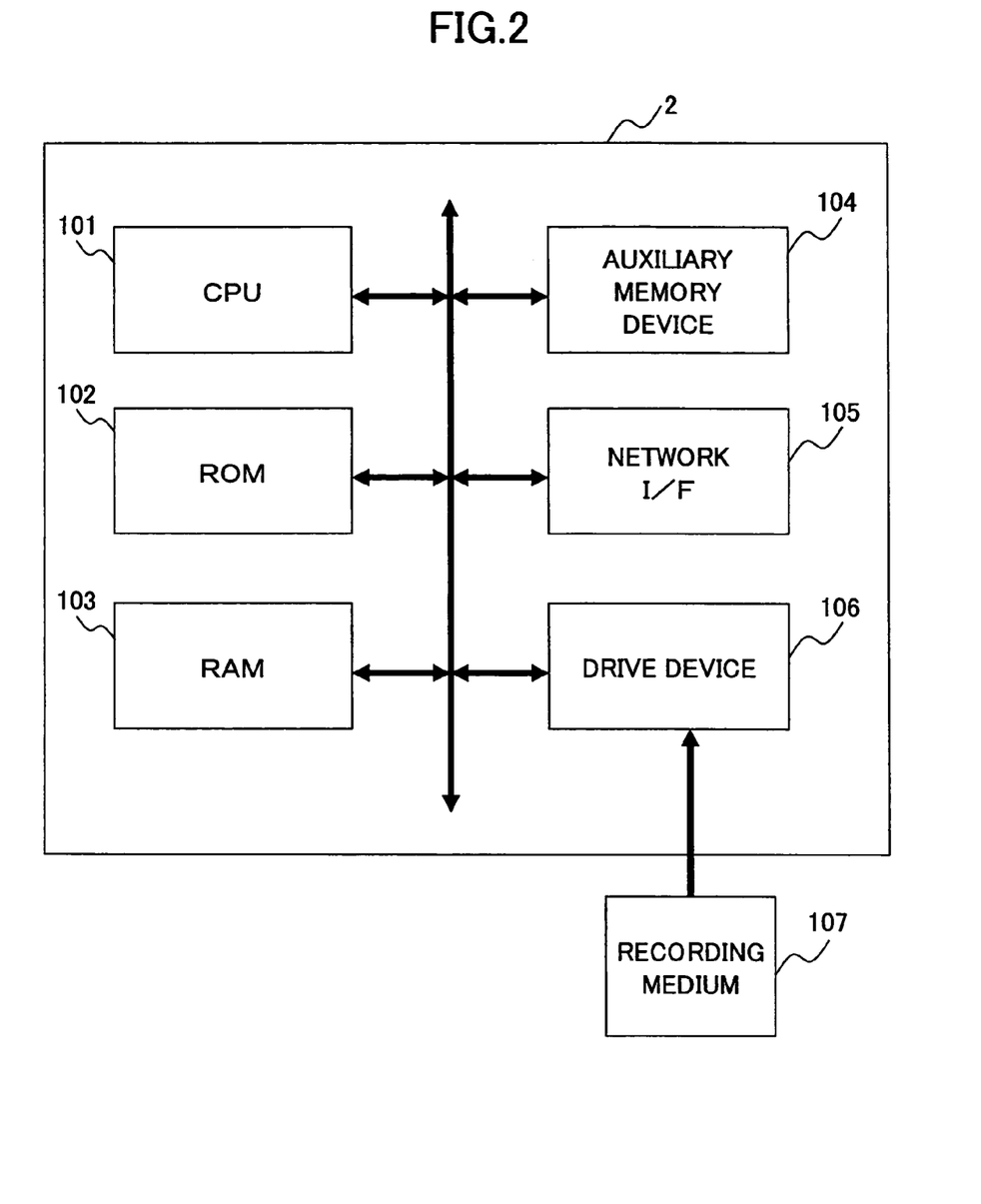
FIG. 2 is a block diagram showing a hardware configuration of a terminal apparatus according to one embodiment of the present invention.

FIG. 2 is a block diagram showing a hardware configuration of the terminal apparatus according to one embodiment of the present invention. As shown in FIG. 2, the terminal apparatus 2 includes a CPU 101, a ROM 102, a RAM 103, an auxiliary memory device 104, a network interface (I/F) 105, a drive device 106, and the like.

The CPU 101 is a control unit for controlling entire portions of the terminal apparatus 2. The CPU 101 executes various programs stored in the ROM 102 and the failure managing unit 14 and performs processes such as apparatus control, communication control, data obtainment, editing, and the like.

The ROM 102 is a memory unit configured to mainly store a control program of an apparatus. The RAM 103 is a memory unit used for work memory of the CPU 101 and for storing temporary data. The failure managing unit 14 is a memory unit configured to store various applications and data.

The network interface (I/F) 105 is an interface for connecting the terminal apparatus 2 to the network 4. The drive device 106 is a device for reading a recording medium 107 such as a CD-ROM and the like in which a program for performing processes according to the present invention is recorded. In other words, the program recorded in the recording medium 107 is read using the drive device 106 and stored in the auxiliary memory device 104, thereby installing the program in the terminal apparatus 2. The installed program and the like are processed by the CPU 101 to realize each function described in FIG. 1, namely, the failure managing unit 14, the operator input/output unit 16, the failure monitoring unit 20, the logical disconnection/connection unit 22, and the like. However, the program may be recorded in the ROM 102 or the auxiliary memory device 104 in advance before the shipment of the terminal apparatus 2, for example. In this case, the drive device 106 is not necessarily required.

Although an operation unit and a display unit are not shown in FIG. 2, an operation unit such as a keyboard, a mouse, other type of input device, or the like and a display unit such as a liquid crystal display, a Braun tube (CRT), or the like may be disposed and the acceptance of input from the user and the display of operation results may be performed.

Next, operations performed by the packet receiving unit 12, the failure managing unit 14, and the operator input/output unit 16 in the terminal apparatus 2 having the configuration as mentioned above are described with reference to FIGS. 3 to 5.

Figure 3:
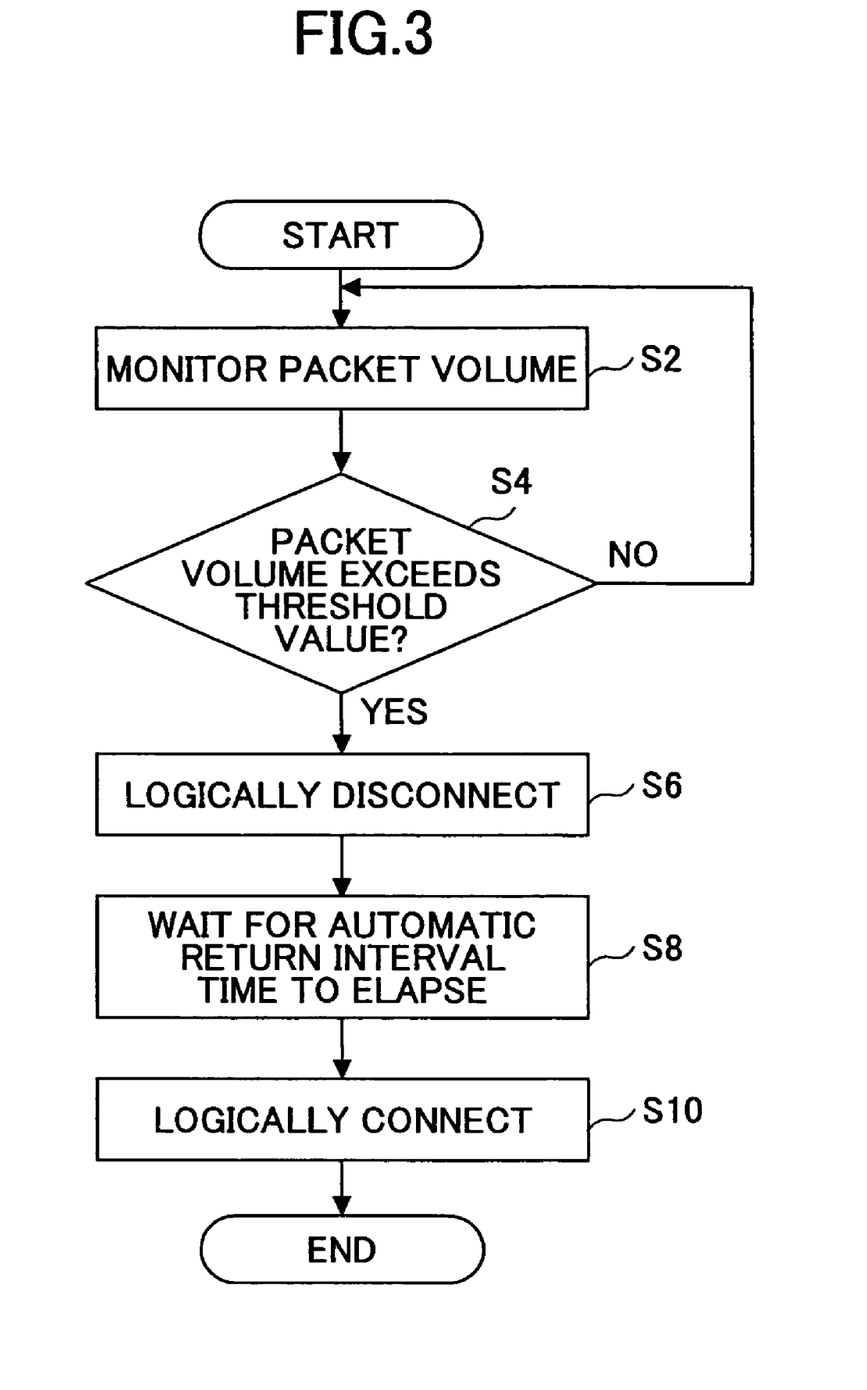
FIG. 3 is a flowchart of disconnection/reconnection processing performed by a terminal apparatus according to the present invention.

First, a basic flow of the disconnection/connection process of a terminal apparatus performed by the terminal apparatus 2 is described with reference to FIG. 3. FIG. 3 is a flowchart of the disconnection/reconnection operation of a terminal apparatus performed by the terminal apparatus 2.

When the disconnection/reconnection operation of a terminal apparatus as shown in FIG. 3 is started, first, in step S2, the failure monitoring unit 20 monitors the volume of packets received by the terminal apparatus 2. In other words, the failure monitoring unit 20 counts the number of broadcast packets received in a predetermined monitoring interval (one second, for example). In step S4, the failure monitoring unit 20 compares the counted number with a threshold value set in advance and judges whether the counted number exceeds the threshold value. When the counted number is not more than the threshold value, the process returns to step S2 and the number of the packets is counted again.

When the counted number is judged to exceed the threshold in step S4, the process proceeds to step S6. In step S6, the logical disconnection/connection unit 22 logically disconnects the terminal apparatus 2 from the network 4. In other words, when the counted number is more than the threshold value, it is judged that a network abnormality (broadcast storm) is generated and the connection between the terminal apparatus 2 and the network 4 is logically disconnected, thereby preventing the terminal apparatus 2 from receiving the massively generated broadcast packets.

The threshold value regarding the number of packet counts can be arbitrarily set. For example, if the threshold value is set to 10000 packets, when the number of broadcast packets received in one second exceeds 10000 packets, it is judged that a broadcast storm is generated.

In the aforementioned description, although the number of broadcast packets is counted and compared with the threshold value, the number of all received packets including the broadcast packets may be counted and compared with the threshold value. In this case, the threshold value may be set higher taking into consideration an average number or a maximum number of a normal packet flow status. However, when temporarily receiving a large amount of regular packets, the counted number may also exceed the threshold value and the terminal apparatus 2 may be disconnected while no broadcast storm is generated. In this respect, the generation of the broadcast storm can be judged with more accuracy by counting only those broadcast packets.

After the terminal apparatus 2 is logically disconnected from the network 4 in step S6, the process awaits until an automatic return interval time set in advance has elapsed in step 8. The automatic return interval time may be set in advance in the failure managing unit 14 or may be input by the operator via the operator input/output unit 16. Preferably, the automatic return interval time is determined in view of time until a normal broadcast storm is ended. For example, the time is set to eight seconds.

When the automatic return interval time has elapsed in step S8, the logical disconnection/connection unit 22 connects the disconnected terminal apparatus 2 to the network 4 in step S10. Accordingly, the terminal apparatus 2 is capable of receiving packets from the network 4. If the automatic return interval time has elapsed and the broadcast storm is ended, the terminal apparatus 2 returns to a normal status where the terminal apparatus 2 performs normal operations while communicating with other terminal apparatus 6 and the host computer 8 via the network 4.

In the aforementioned process, the terminal apparatus 2 is automatically reconnected (automatic return) to the network 4 after the automatic return interval time has elapsed. However, the operator may manually perform the reconnection (manual return) without using the automatic return. In other words, in the aforementioned operation, after the disconnection process is performed in step S6, it is possible to wait thereafter and perform the reconnection process by the manual return. Or when the automatic return is performed as shown in FIG. 3, it is possible to perform the reconnection process by the manual return without waiting for the automatic return interval time to elapse.

Further, the disconnection order and the connection order to the logical disconnection/connection unit 22 may be directly sent from the failure managing unit 14 or via the failure monitoring unit 20.

Figure 4:
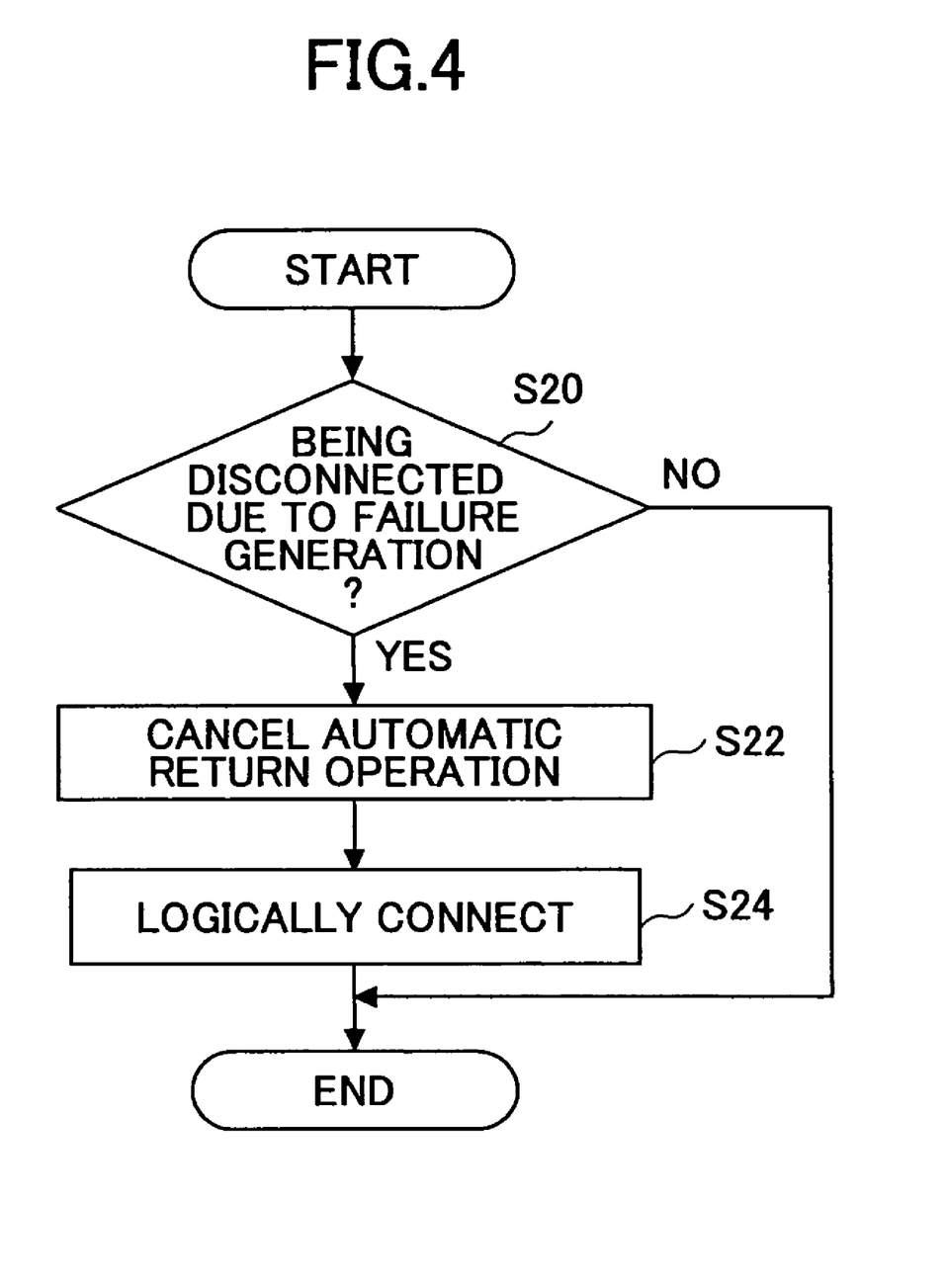
FIG. 4 is a flowchart of a manual return operation.

FIG. 4 is a flowchart of the manual return operation during the automatic return shown in FIG. 3. First, when the operator wishes to immediately perform the reconnection process without waiting for the automatic return, the operator inputs a manual return request via the operator input/output unit 16. The failure managing unit 14 that has received the manual return request judges in step S20 whether the terminal apparatus 2 is being disconnected due to failure generation. If the terminal apparatus 2 is not disconnected, the process is ended.

If the terminal apparatus 2 is judged to be disconnected from the network 4 in step S20, a process for canceling the automatic return operation is performed in step S22. In other words, the process from S8 in FIG. 3 is cancelled. In step S24, the failure managing unit 14 sends the connection order to the logical disconnection/connection unit 22 and the logical disconnection/connection unit 22 connects the terminal apparatus 2 to the network 4, thereby ending the process.

Figure 5:
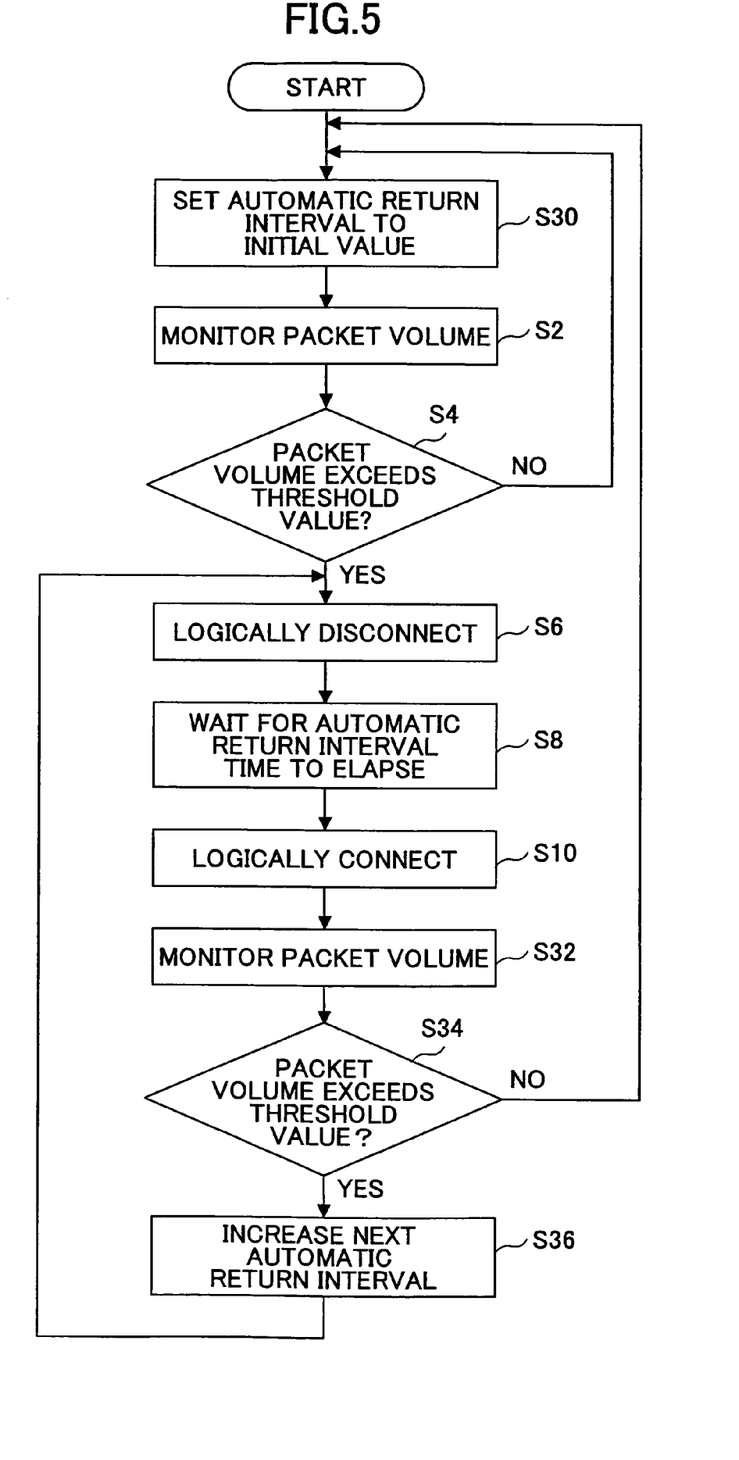
FIG. 5 is a flowchart of a disconnection/reconnection operation of a terminal apparatus performed while gradually increasing an automatic return interval time.

Next, an operation of gradually increasing the automatic return interval time in the disconnection/reconnection operation of a terminal apparatus shown in FIG. 3 is described with reference to FIG. 5. FIG. 5 is a flowchart of the disconnection/reconnection operation of a terminal apparatus performed while gradually increasing the automatic return interval time. In FIG. 5, the same steps as shown in FIG. 3 are provided with the same step numerals and the description thereof is omitted.

When the disconnection/reconnection operation of a terminal apparatus shown in FIG. 5 is started, first, the automatic return interval time is set to an initial value in step S30. For example, the initial value is set to eight seconds as mentioned above. Next, the process from step S2 to S10 shown FIG. 3 is performed. In other words, when the volume of received packets exceeds the threshold value, the terminal apparatus 2 is logically disconnected from the network 4. Thereafter, the terminal apparatus 2 is reconnected to the network 4 after the automatic return interval time set to eight seconds as the initial value has elapsed.

After the terminal apparatus 2 is reconnected to the network 4 in step S10, the failure monitoring unit 20 monitors in step S32 the volume of packets received by the terminal apparatus 2. In other words, the failure monitoring unit 20 counts the number of broadcast packets received in a predetermined monitoring interval (one second, for example). In step S34, the failure monitoring unit 20 compares the counted number with a threshold value set in advance and judges whether the counted number exceeds the threshold value.

When the counted number is not more than the threshold value, the process returns to step S30, sets the automatic return interval time to the initial value (eight seconds), and performs processing from step S2. In other words, when a network abnormality such as a broadcast storm is eliminated upon automatic return, the automatic return interval time is maintained in the initial value (eight seconds, in this example).

On the other hand, when the counted number is judged to exceed the threshold value in step S34, the process proceeds to step S36 and increases the automatic return interval time. In this example, the automatic return interval time is increased from eight seconds in the initial value to sixteen seconds. Thereafter, the process returns to step S6 and the logical disconnection/connection unit 22 logically disconnects the terminal apparatus 2 from the network 4. In other words, the judgment that the number of received packets exceeds the threshold value at a first judgment after the reconnection means that the network abnormality (broadcast storm) is yet to be ended. Thus, taking into consideration the possibility that the network failure may be prolonged, the automatic return interval time is increased (doubled in this example) and then the presence or absence of the network failure is judged by comparing again the number of received packets with the threshold value. Thereafter, while the network failure continues to exist, the automatic return interval time is gradually increased. For example, in the present embodiment, the time is gradually increased from 8 seconds as the initial value to 16 seconds, 32 seconds, and 64 seconds. The 64 seconds is maintained after being set because if the automatic return interval time is too long, the terminal apparatus 2 remains disconnected from the network 4 even when the network failure is eliminated.

Figure 6:
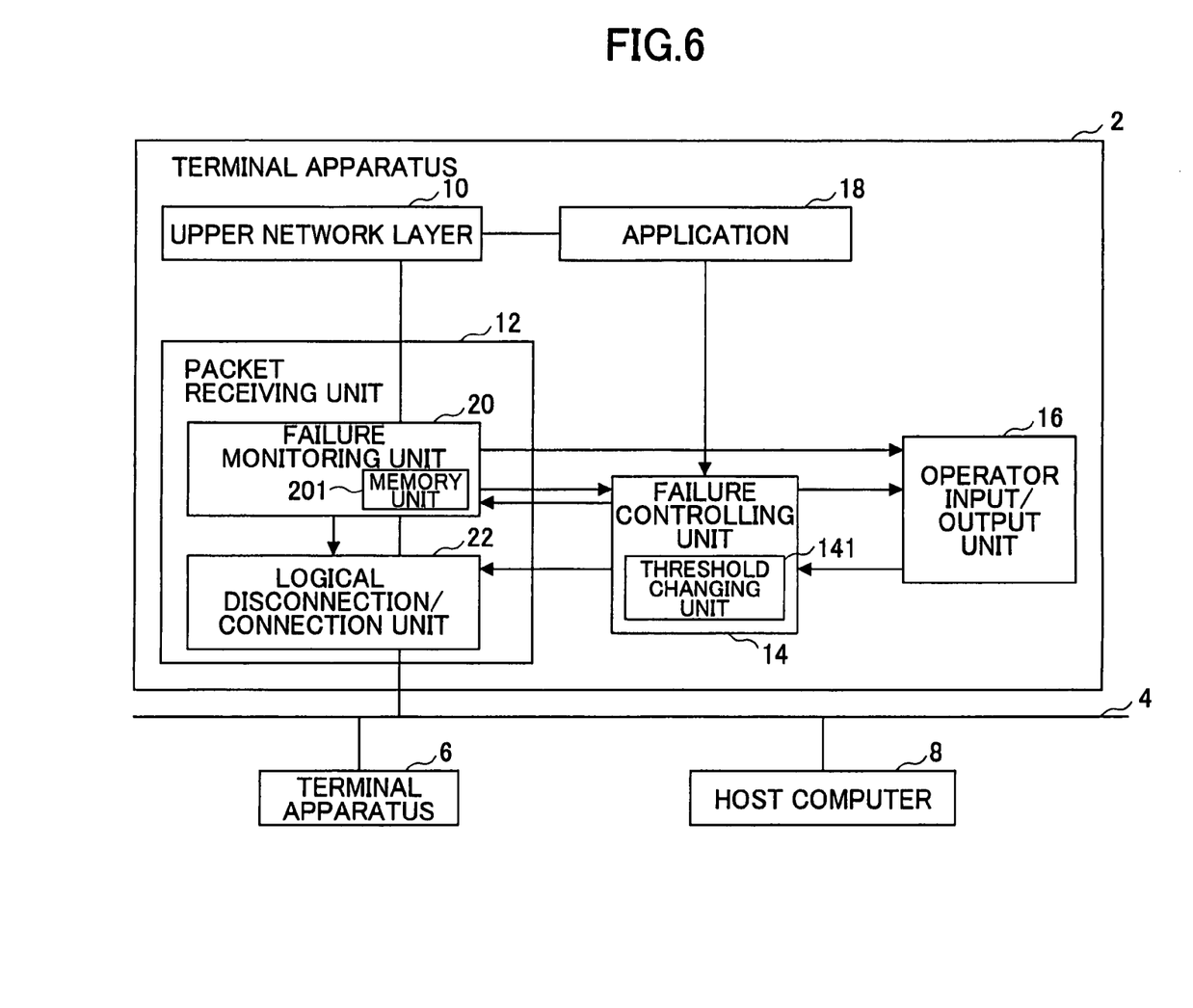
FIG. 6 is a block diagram showing a functional configuration of a terminal apparatus for describing a function for changing a threshold value for the number of counted packets.

Next, a function for changing the threshold value for the number of counted packets is described in detail. FIG. 6 is a block diagram showing a functional configuration of the terminal apparatus for describing the function for changing the threshold value for the number of counted packets. In FIG. 6, the same units as in FIG. 1 are provided with the same numerals and the description thereof is omitted. In FIG. 6, an application 18, a threshold changing unit 141, and a memory unit 201 are further displayed.

The application 18 is what is called an application program and performs processing required from the host computer 8 via the network 4. The threshold changing unit 141 includes a function for changing (rewriting) the threshold value for the number of counted packets, the threshold value being managed as a portion of behavior information in the failure managing unit 14. The memory unit 201 includes a function for storing parameters indicating a status of the network 4 such as the number of logical disconnection of the network 4, the maximum volume of packets in the past, and the like.

The terminal apparatus 2 shown in FIG. 6 is capable of dynamically and automatically changing the threshold value in accordance with the contents of processes requested from the host computer 8 and the status of the network 4. In other words, a process request from the host computer 8 via the network 4 is transmitted to the application 18 via the packet receiving unit 12 and the upper network layer 10, the application 18 being called in accordance with the process request. However, the application 18 causes the threshold changing unit 141 to change the threshold value by notifying the threshold changing unit 141 of a threshold value depending on the contents and characteristics of the processes performed by the application 18. Specifically, the threshold value may be changed based on the dependence of the application 18 on communication process, for example. In other words, if the application 18 has high dependence on the communication process, when the network 4 is logically disconnected, it is difficult for the application 18 to perform its functions. Thus, the application 18 may request the threshold changing unit 141 to increase the threshold value. By increasing the threshold value, the allowance for the volume of packet reception is increased and the frequency of the logical disconnection of the network 4 is decreased. When the application 18 performs a process with a high degree of urgency, the frequency of the suspension of the process of the application 18 can be lowered by increasing the threshold value in the same manner.

By contrast, when the application 18 performs a process with a high load and a low dependency on the communication process, the threshold value may be decreased. Accordingly, when the volume of received packets is increased, the terminal apparatus 2 is promptly disconnected from the network 4, so that it is possible to quickly avoid consuming the processing capability of the CPU 101 in the processing of the packets. The threshold value may be nonunique depending on the types of the application 18 and may be changed in accordance with the transition of the contents of the processing in the same the application 18.

Further, the failure monitoring unit 20 controls the change of the threshold value in accordance with the status of the network 4. In other words, the failure monitoring unit 20 judges the status of the network 4 based on information recorded in the memory unit 201 such as the number of the logical disconnection of the network 4 (hereafter simply referred to as "disconnection number") in the past, the maximum volume of packets in the past, and the like and requests the failure managing unit 14 to change the threshold value based on the judgment. For example, when the disconnection number is increased, it is assumed that one of the causes thereof may be the setting of the threshold value being too low. Thus, in this case, by increasing the threshold value, it is possible to reduce the disconnection number and lower the frequency of the suspension of the processing in the terminal apparatus 2 resulting from a small packet storm.

Moreover, the change of the threshold value may be manually performed by the user. For example, when the threshold value is to be changed using the host computer 8 via the network 4, the application 18 for changing the threshold value is implemented in the terminal apparatus 2. The threshold value set in the host computer 8 is transmitted to the application 18 and the application 18 causes the threshold changing unit 141 to change the threshold value by notifying the threshold changing unit 141 of the threshold value being set. When the change is directly (locally) performed in the terminal apparatus 2, the threshold value input via the operator input/output unit 16 is notified to the threshold changing unit 141 and the threshold value is changed.

By arbitrarily changing the threshold value through the user operation, for example, it possible to easily set the threshold value in accordance with the processing capability of each terminal apparatus 2 and the contents of the processing performed by each terminal apparatus 2.

As mentioned above, when the network failure such as the broadcast storm is generated, the terminal apparatus is capable of automatically disconnecting itself from the network and continuously performing the processing in the terminal apparatus. Also, after a predetermined time has elapse, the terminal apparatus is automatically reconnected to the network, so that the terminal apparatus is automatically returned to the network after the network failure is eliminated.

In the aforementioned disconnection/reconnection processing of a terminal apparatus performed by the terminal apparatus 2, the terminal apparatus 2 is capable of performing, as its own operation, the disconnection from the network through the control on the terminal apparatus side without depending on the control of the network system. However, the present invention is not limited to this construction. The disconnection/reconnection processing of a terminal apparatus as mentioned above may be performed by connecting the packet receiving unit and the failure managing unit to the network independently of the terminal apparatus 2.

In addition, the aforementioned embodiment may be applied to a network in a factory besides a general computer system including PCs (Personal Computer) and the like. For example, when it is assumed that the network 4 includes a LAN (local area network) in a factory and the terminal apparatuses 2 and 6 include manufacturing equipment in the factory, the present invention can be applied to a system in which the manufacturing equipment 2 and 6 are controlled using the host computer 8. If the broadcast storm is generated when elements of the manufacturing equipment in the factory are connected via the network and controlled and/or managed using the host computer, the processing capability of the manufacturing equipment is lowered and the manufacturing is suspended in a conventional network system. However, by constructing the manufacturing equipment as in the terminal apparatus 2 according to the present invention, the manufacturing equipment is capable of being automatically disconnected from the network and continuously performing operations (manufacturing steps) of the manufacturing equipment. Then, by automatically returning in a short time, it is possible to continue the manufacturing steps with little influence of the broadcast storm. Thus, it is possible to prevent loss resulting from the suspension of the manufacturing steps, for example.

In the aforementioned embodiment, although the number of a large amount of broadcast packets capable of causing a network failure is detected, the number of received error packets may be detected in addition to detecting the number of the received broadcast packets. In other words, the error packets are abruptly generated because of a failure of hardware in the apparatus connected to the network and the like and the error packets may be massively generated as in the case of broadcast packets.

The error packets include short packets, long packets, CRC packets, and the like. The short packets have a size smaller than a default size and can be identified and/or detected by comparing the packet size thereof with the default size. The long packets have a size greater than the default size and can be identified and/or detected by comparing the packet size thereof with the default size. The CRC packets have errors detected by a CRC method and can be identified and/or detected by detecting CRC errors.

In the aforementioned embodiment, when the broadcast packets are massively generated, the terminal apparatus is logically disconnected from the network. However, when the aforementioned error packets are massively generated, the terminal apparatus may be logically disconnected from the network. In other words, in the aforementioned embodiment, the effects of the present invention can be provided in the same manner when the number of the broadcast packets is replaced with the number of the error packets. In this case, when the number of the error packets exceeds the threshold value, a network failure is judged to be generated and the terminal apparatus is to be logically disconnected from the network. Or the terminal apparatus may be logically disconnected from the network based on both numbers of the broadcast packets and the error packets. In this case, when the sum of the number of the broadcast packets and the number of the error packets exceeds a predetermined threshold value, a network failure is assumed to be generated and the terminal apparatus is to be logically disconnected from the network.

The present invention is not limited to the specifically disclosed embodiment, and variations and modifications may be made without departing from the scope of the present invention.

The present application is based on Japanese priority application No. 2003-370719 filed Oct. 30, 2003, the entire contents of which are hereby incorporated herein by reference.

The invention claimed is:

1. A terminal apparatus connected to a network and configured to perform an operation, the terminal apparatus comprising:
    a packet volume detecting unit configured to detect a number of packets received from the network in a predetermined time;
    a logical disconnecting unit configured to logically disconnect the terminal apparatus from the network when the number of packets detected by the packet volume detecting unit exceeds a predetermined value; and
    a reconnecting unit configured to reconnect the terminal apparatus when a return interval time has passed after the terminal apparatus was disconnected from the network by the logical disconnecting unit,
    wherein the reconnecting unit increases the return interval time from the return interval time at the immediately preceding disconnection when the number of packets, which the packet volume detecting unit detects for a first time after the reconnection, exceeds the predetermined value, and when the increased return interval time reaches an upper limit value, the reconnecting unit maintains the return interval time at the upper limit value.

2. The terminal apparatus according to claim 1, wherein the packet volume detecting unit detects the number of only those broadcast packets among packets received by the terminal apparatus, and the logical disconnecting unit logically disconnects the terminal apparatus from the network when the number of broadcast packets received in a predetermined time exceeds a predetermined value.

3. The terminal apparatus according to claim 1, further including:
    an inputting device for inputting a connection request for connecting said terminal apparatus to said network.

4. The terminal apparatus according to claim 1, further including:
    a display device for displaying the fact that said terminal apparatus is disconnected.

5. The terminal apparatus according to claim 1, further including:
    a unit for storing history information about disconnection and reconnection of said terminal apparatus; and
    a display device for displaying the history information.

6. The terminal apparatus according to claim 1, wherein said packet volume detecting unit does not detect said number of packets when the terminal apparatus is logically disconnected from said network.

7. The terminal apparatus according to claim 1, further including:
    a first changing unit configured to change said predetermined value in accordance with a processing load of a CPU of the terminal apparatus.

8. The terminal apparatus according to claim 7, wherein said first changing unit changes said predetermined value in accordance with a transition of said processing load required via said network.

9. The terminal apparatus according to claim 1, further including:
    a changing unit configured to change said predetermined value in accordance with a status of said network.

10. A control method of a terminal apparatus connected to a network and configured to perform an operation, the control method of a terminal apparatus comprising the steps of:
    detecting a number of packets received from a network in a predetermined time;
    logically disconnecting the terminal apparatus from the network when the detected number of packets exceeds a predetermined value; and
    reconnecting the terminal apparatus when a return interval time has passed after the terminal apparatus was disconnected from the network,
    wherein the return interval time is increased from the return interval time at the immediately preceding disconnection when the number of packets detected after the reconnection exceeds the predetermined value, and when the increased return interval time reaches an upper limit value, maintaining the return interval time at the upper limit value.

11. A non-transitory computer readable storage medium with code embodied therein for performing a control method of a terminal apparatus connected to a network and configured to perform an operation, the method comprising:
    detecting a number of packets received from the network in a predetermined time;
    logically disconnecting the terminal apparatus from the network when the detected number of packets exceeds a predetermined value; and
    reconnecting the terminal apparatus when a return interval time has passed after the terminal apparatus was disconnected from the network,
    wherein the return interval time is increased from the return interval time at the immediately preceding disconnection when the number of packets detected after the reconnection exceeds the predetermined value, and when the increased return interval time reaches an upper limit value, maintaining the return interval time at the upper limit value.

12. A network system including a plurality of terminal apparatuses connected to a network, each terminal apparatus comprising:
    a packet volume detecting unit configured to detect the number of packets received from the network in a predetermined time;
    a logical disconnecting unit configured to logically disconnect the terminal apparatus from the network when the number of packets detected by the packet volume detecting unit exceeds a predetermined value; and a reconnecting unit configured to reconnect the terminal apparatus when a return interval time has passed after the terminal apparatus was disconnected from the network by the logical disconnect, wherein the reconnecting unit increases the return interval time from the return interval time at the immediately preceding disconnection when the number of packets, which the packet volume detecting unit detects for a first time after the reconnection, exceeds the predetermined value, and when the increased return interval time reaches an upper limit value, the reconnecting unit maintains the return interval time at the upper limit value.

13. A control method of a network system including a plurality of terminal apparatuses connected to a network, the control method of a network system comprising the steps of:

detecting, in each terminal apparatus, the number of packets received from the network in a predetermined time;

logically disconnecting a corresponding terminal apparatus from the network when the detected number of packets exceeds a predetermined value; and reconnecting the corresponding terminal apparatus when a return interval time has passed after the corresponding terminal apparatus was disconnected from the network, wherein the return interval time is increased from the return interval time at the immediately preceding disconnection when the number of packets detected after the reconnection exceeds the predetermined value, and when the increased return interval time reaches an upper limit value, maintaining the return interval time at the upper limit value.

14. A non-transitory computer readable storage medium with code embodied therein for performing a control method of a network system including a plurality of terminal apparatuses connected to a network, the method comprising:

detecting, in each of the plurality of terminal apparatuses, a number of packets received from the network in a predetermined time;

logically disconnecting a corresponding terminal apparatus from the network when the detected number of packets exceeds a predetermined value; and reconnecting the corresponding terminal apparatus when a return interval time has passed after the corresponding terminal apparatus was disconnected from the network, wherein the return interval time is increased from the return interval time at the immediately preceding disconnection when the number of packets detected after the reconnection exceeds the predetermined value, and when the increased return interval time reaches an upper limit value, maintaining the return interval time at the upper limit value.

* * * * *

UNITED STATES PATENT AND TRADEMARK OFFICE
CERTIFICATE OF CORRECTION

PATENT NO. : 7,830,811 B2  
APPLICATION NO. : 10/577452  
DATED : November 9, 2010  
INVENTOR(S) : Hiroshi Yamada et al.

Page 1 of 1

It is certified that error appears in the above-identified patent and that said Letters Patent is hereby corrected as shown below:

Title page, item 75 (inventors) line 2, "Utsunoimiya" should read --Utsunomiya--.

Signed and Sealed this
Twenty-fifth Day of January, 2011

David J. Kappos
*Director of the United States Patent and Trademark Office*